(12) United States Patent
Yin et al.

(10) Patent No.: US 12,441,978 B2
(45) Date of Patent: Oct. 14, 2025

(54) ALL-SCALE SELF-ASSEMBLY AND PRECISE POSITIONING OF SUPRAPARTICLES

(71) Applicant: THE REGENTS OF THE UNIVERSITY OF CALIFORNIA, Oakland, CA (US)

(72) Inventors: Yadong Yin, Riverside, CA (US); Dilong Liu, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 356 days.

(21) Appl. No.: 18/252,558

(22) PCT Filed: Nov. 12, 2021

(86) PCT No.: PCT/US2021/059097
§ 371 (c)(1),
(2) Date: May 11, 2023

(87) PCT Pub. No.: WO2022/104027
PCT Pub. Date: May 19, 2022

(65) Prior Publication Data
US 2024/0002780 A1    Jan. 4, 2024

Related U.S. Application Data

(60) Provisional application No. 63/112,678, filed on Nov. 12, 2020.

(51) Int. Cl.
| | | |
|---|---|---|
| C12N 1/20 | (2006.01) | |
| B01J 13/08 | (2006.01) | |
| B22F 1/054 | (2022.01) | |
| B22F 9/24 | (2006.01) | |
| C01B 19/00 | (2006.01) | |
| C01B 33/14 | (2006.01) | |
| C01G 7/00 | (2006.01) | |
| C01G 49/02 | (2006.01) | |
| C01G 49/06 | (2006.01) | |
| C01G 49/08 | (2006.01) | |
| C07H 21/04 | (2006.01) | |
| C07K 14/47 | (2006.01) | |
| C08G 73/02 | (2006.01) | |

(52) U.S. Cl.
CPC .............. *C12N 1/20* (2013.01); *B01J 13/08* (2013.01); *B22F 1/054* (2022.01); *B22F 9/24* (2013.01); *C01B 19/007* (2013.01); *C01B 33/14* (2013.01); *C01G 7/00* (2013.01); *C01G 49/02* (2013.01); *C01G 49/06* (2013.01); *C01G 49/08* (2013.01); *C07H 21/04* (2013.01); *C07K 14/4732* (2013.01); *C08G 73/0273* (2013.01); *B22F 2301/255* (2013.01); *C01P 2002/10* (2013.01); *C01P 2002/20* (2013.01); *C01P 2004/03* (2013.01)

(58) Field of Classification Search
CPC ....................................................... C12N 1/20
See application file for complete search history.

(56) References Cited

U.S. PATENT DOCUMENTS

| | | | |
|---|---|---|---|
| 4,983,369 A | 1/1991 | Barder et al. | |
| 9,534,213 B2 | 1/2017 | Kotov | |
| 2002/0022111 A1 | 2/2002 | Black et al. | |
| 2005/0214661 A1 | 9/2005 | Stasiak et al. | |
| 2018/0136056 A1* | 5/2018 | Li | G01L 1/18 |
| 2018/0147594 A1 | 5/2018 | Kim et al. | |

FOREIGN PATENT DOCUMENTS

| | | |
|---|---|---|
| JP | 2000-190300 A | 7/2000 |
| JP | 2002-508259 A | 3/2002 |
| JP | 2008-260297 A | 10/2008 |
| WO | 99/30835 A1 | 6/1999 |
| WO | 2015187833 A1 | 12/2015 |
| WO | 2019067734 A1 | 4/2019 |

OTHER PUBLICATIONS

Chen, et al., "Light-Gated Synthetic Protocells for Plasmon-Enhanced Chemiosmotic Gradient Generation and Phosphorylation", Wiley, 2019, pp. 1-7.
International Search Report (PCT/ISA/210) and Written Opinion (PCT/ISA/237) mailed on Feb. 18, 2022, by the US Patent Office as the International Searching Authority for International Application No. PCT/US2021/059097.

(Continued)

*Primary Examiner* — Albert M Navarro
(74) *Attorney, Agent, or Firm* — Buchanan Ingersoll & Rooney PC

(57) ABSTRACT

A method is disclosed of assembling building blocks into supraparticles. The method includes applying a first solvent on a template of patterned recessed regions to wet surfaces of the recessed regions; applying a second solvent on the template of patterned recessed regions, the building blocks suspended in the second solvent; wherein the first solvent and the second solvent are partially miscible, resulting in negligible interfacial surface tension between the first and second solvents; and wherein droplets of the second solvent diffuse droplets of the first solvent in the recessed regions, thereby assembling the building blocks into the supraparticles in the recessed regions.

22 Claims, 13 Drawing Sheets

(56) References Cited

OTHER PUBLICATIONS

Paunov, et al., "Supraparticles and "Janus" Particles Fabricated by Replication of Particle Monolayers at Liquid Surfaces Using a Gel Trapping Technique", Advanced Materials, 2004, pp. 788-791.

Zhang et al., "Flexible Ferrofluids: Design and Applications", Advanced Materials, 2019, pp. 1-35.

Al, et al., "Sp2 C-Dominant N-doped Carbon Sub-Micrometer Spheres with a Tunable Size: a Versatile Platform for Highly Efficient Oxygen-Reduction Catalysts", Advanced Materials, vol. 25, No. 7, Feb. 20, 2013, pp. 998-1003.

Berthier, et al., "The Physics of Microdroplets", John Wiley & Sons, 2012, 383 pages.

Cassie, et al., "Wettability of Porous Surfaces", Transactions of the Faraday Society, vol. 40, 1944, pp. 546-551.

Chen, et al., "Space-Confined Seeded Growth of Cu Nanorods with Strong Surface Plasmon Resonance for Photothermal Actuation", Angewandte Chemie International Edition, vol. 58, No. 27, Jul. 1, 2019, pp. 9275-9281.

Chou, et al., "DNA Assembly of Nanoparticle Superstructures for Controlled Biological Delivery and Elimination", Nature Nanotechnology, vol. 9, No. 2, Feb. 2014, pp. 148-155 (17 pages).

Dinsmore, et al., "Colloidosomes: Selectively Permeable Capsules Composed of Colloidal Particles", Science, vol. 298, No. 5595, Nov. 1, 2002, pp. 1006-1009 (5 pages).

Fan, et al., "Three-Dimensional All-Dielectric Metamaterial Solid Immersion Lens for Subwavelength Imaging at Visible Frequencies", Science Advances, vol. 2, No. 8, Article No. e1600901, Aug. 12, 2016, 9 pages.

Fan, et al., "Transparent Triboelectric Nanogenerators and Self-powered Pressure Sensors Based on Micropatterned Plastic Films", Nano Letters, vol. 12, No. 6, Jun. 13, 2012, pp. 3109-3114.

Freeman, et al., "Reversible Self-Assembly of Superstructured Networks", Science, vol. 362, No. 6416, 2018, pp. 808-813.

Fujii, et al., "Soft Janus Colloidal Crystal Film", Angewandte Chemie International Edition, vol. 51, No. 39, Sep. 24, 2012, pp. 9809-9813.

Gao, et al., "Controllable Fabrication of Au Nanocups by Confined-Space Thermal Dewetting for OCT Imaging", Advanced Materials, vol. 29, No. 26, Article No. 1701070, Jul. 12, 2017, pp. 1-7.

Ge, et al., "One-Step Synthesis of Highly Water-Soluble Magnetite Colloidal Nanocrystals", Chemistry Europe, vol. 13, No. 25, 2007, pp. 7153-7161 (10 pages).

Ge, et al., "Superparamagnetic Magnetite Colloidal Nanocrystal Clusters", Angewandte Chemie International Edition, vol. 46, No. 23, Jun. 4, 2007, pp. 4342-4345.

Gerling, et al., "Dynamic DNA Devices and Assemblies Formed by Shape-Complementary, Non-Base Pairing 3D Components", Science, vol. 347, No. 6229, Mar. 27, 2015, pp. 1446-1452 (8 pages).

Guo, et al., "Modular Assembly of Superstructures from Polyphenol-Functionalized Building Blocks", Nature Nanotechnology, vol. 11, Dec. 2016, pp. 1105-1111 (8 pages).

Hsia, et al., "Design of a Hyperstable 60-Subunit Protein Icosahedron", Nature, vol. 535, No. 7610, Jul. 7, 2016, pp. 136-139 (13 pages).

Huang, et al., "The Coming of Age of De Novo Protein Design", Nature, vol. 537, No. 7620, Sep. 15, 2016, pp. 320-327.

Jin, et al., "Fluorescence Spectroelectrochemistry of Multilayer Film Assembled CdTe Quantum Dots Controlled by Applied Potential in Aqueous Solution", The Journal of Physical Chemistry C, vol. 114, No. 2, 2010, pp. 803-807.

Jones, et al., "Programmable Materials and the Nature of the DNA Bond", Science, vol. 347, No. 6224, Article No. 1260901, Feb. 20, 2015, 13 pages.

King, et al., "Accurate Design of Co-Assembling Multi-Component Protein Nanomaterials", Nature, vol. 510, No. 7503, Jun. 5, 2014, pp. 103-108 (12 pages).

Kotov, Nicholas A, "Particle Self-Assembly: Superstructures Simplified", Nature Nanotechnology, vol. 11, Dec. 2016, pp. 1002-1003.

Lecault, et al., "High-Throughput Analysis of Single Hematopoietic Stem Cell Proliferation in Microfluidic Cell Culture Arrays", Nature Methods, vol. 8, No. 7, May 22, 2011, pp. 581-586 (10 pages).

Li, et al., "Bottom-Up Construction of a Superstructure in a Porous Uranium-Organic Crystal", Science, vol. 356, No. 6338, May 12, 2017, pp. 624-627 (5 pages).

Lin, et al., "Building Superlattices from Individual Nanoparticles via Template-Confined DNA-Mediated Assembly", Science, vol. 359, No. 6376, Feb. 9, 2018, pp. 669-672 (5 pages).

Lin, et al., "Clathrate Colloidal Crystals", Science, vol. 355, No. 6328, Mar. 3, 2017, pp. 931-935 (6 pages).

Liu, et al., "Black Gold: Plasmonic Colloidosomes with Broadband Absorption Self-Assembled from Monodispersed Gold Nanospheres by Using a Reverse Emulsion System", Angewandte Chemie International Edition, vol. 54, No. 33, Aug. 10, 2015, pp. 9596-9600.

Liu, et al., "Capillary Gradient-Induced Self-Assembly of Periodic Au Spherical Nanoparticle Arrays on an Ultralarge Scale via a Bisolvent System at Air/Water Interface", Advanced Materials Interfaces, vol. 4, No. 10, Article No. 1600976, May 23, 2017, pp. 1-8.

Liu, et al., "Diamond Family of Nanoparticle Superlattices", Science, vol. 351, No. 6273, Feb. 5, 2016, pp. 582-586 (6 pages).

Liu, et al., "Ultrasensitive and Stable Au Dimer-Based Colorimetric Sensors Using the Dynamically Tunable Gap-Dependent Plasmonic Coupling Optical Properties", Advanced Functional Materials, vol. 28, No. 18, Article No. 1707392, May 4, 2018, 12 pages.

Lu, et al., "Superlattices Assembled Through Shape-Induced Directional Binding", Nature Communications, vol. 6, Article No. 6912, Apr. 23, 2015, pp. 1-10.

MacFarlane, et al., "Nanoparticle Superlattice Engineering with DNA", Science, vol. 334, No. 6053, Oct. 14, 2011, pp. 204-208 (6 pages).

Nagaoka, et al., "Single-Component Quasicrystalline Nanocrystal Superlattices Through Flexible Polygon Tiling Rule", Science, vol. 362, No. 6421, Dec. 21, 2018, pp. 1396-1400 (6 pages).

Nagaoka, et al., "Superstructures Generated from Truncated Tetrahedral Quantum Dots", Nature, vol. 561, 2018, pp. 378-382 (16 pages).

Salaita, et al., "Applications of Dip-Pen Nanolithography", Nature Nanotechnology, vol. 2, 2007, pp. 145-155.

Singh, et al., "Self-Assembly of Magnetite Nanocubes into Helical Superstructures", Science, vol. 345, No. 6201, Sep. 5, 2014, pp. 1149-1153 (6 pages).

Stober, et al., "Controlled Growth of Monodisperse Silica Spheres in the Micron Size Range", Journal of Colloid and Interface Science, vol. 26, No. 1, Jan. 1968, pp. 62-69.

Talapin, et al., "Quasicrystalline Order in Self-assembled Binary Nanoparticle Superlattices", Nature, vol. 461, No. 7266, Oct. 15, 2009, pp. 964-967.

Velev, et al., "Assembly of Latex Particles by Using Emulsion Droplets as Templates. 1. Microstructured Hollow Spheres", Langmuir, vol. 12, No. 10, 1996, pp. 2374-2384.

Velev, et al., "Assembly of Latex Particles by Using Emulsion Droplets. 3. Reverse (Water in Oil) System", Langmuir, vol. 13, No. 6, 1997, pp. 1856-1859.

Wang, et al., "Self-Assembled Colloidal Superparticles from Nanorods", Science, vol. 338, No. 6105, Oct. 19, 2012, pp. 358-363 (7 pages).

Wasio, et al., "Self-Assembly of Hydrogen-Bonded Two-Dimensional Quasicrystals", Nature, vol. 507, No. 7490, Mar. 6, 2014, pp. 86-89 (11 pages).

Whitesides, George M, "The Origins and the Future of Microfluidics", Nature, vol. 442, No. 7101, Jul. 27, 2006, pp. 368-373.

Yang, et al., "Orientation Mediated Enhancement on Magnetic Hyperthermia of Fe3O4 Nanodisc", Advanced Functional Materials, vol. 25, No. 5, Feb. 4, 2015, pp. 812-820 (10 pages).

Yang, et al., "Scalable Assembly of Crystalline Binary Nanocrystal Superparticles and their Enhanced Magnetic and Electrochemical Properties", Journal of the American Chemical Society, vol. 140, No. 44, Nov. 7, 2018, pp. 15038-15047.

Ye, et al., "Photonic Crystal Microcapsules for Label-Free Multiplex Detection", Advanced Materials, vol. 26, No. 20, May 28, 2014, pp. 3270-3274.

(56) References Cited

OTHER PUBLICATIONS

Zarzar, et al., "Dynamically Reconfigurable Complex Emulsions via Tunable Interfacial Tensions", Nature, vol. 518, No. 7540, Feb. 26, 2015, pp. 520-524 (13 pages).
Zhang, et al., "A General Strategy for the DNA-Mediated Self-Assembly of Functional Nanoparticles into Heterogeneous Systems", Nature Nanotechnology, vol. 8, No. 11, Nov. 2013, pp. 865-872.
Zhang, et al., "Breath Figure: A Nature-Inspired Preparation Method for Ordered Porous Films", Chemical Reviews, vol. 115, 2015, pp. 9801-9868.
Zhu, et al., "Analysis of Yeast Protein Kinases Using Protein Chips", Nature Genetics, vol. 26, No. 3, Nov. 2000, pp. 283-289.
Zhu, et al., "Fabrication of Bioinspired Hierarchical Functional Structures by Using Honeycomb Films as Templates", Advanced Functional Materials, vol. 28, No. 37, Article No. 1803194, Sep. 12, 2018, 9 pages.
C. N. R. Rao et al., "Synthesis of Inorganic Nanotubes", Advanced Materials, vol. 21, No. 42, (Nov. 13, 2009), pp. 4208-4233, XP055007010.
Chunxia et al., "Polydopamine Microcapsules From Cellulose Nanocrystal Stabilized Pickering Emulsions for Essential Oil and Pesticide Encapsulation", Colloids and Surfaces A : Physiochemical and Engineerings Aspects, vol. 570 , (Mar. 2019), pp. 403-413, XP085657758.
Extended European Search Report issued on Oct. 1, 2024, in corresponding European Patent Application No. 21892853.9. (14 pages).
Lu et al., "Surfactant-Assisted Synthesis of [Alpha]-$Fe_2O_3$ Nanotubes and Nanorods With Shape-Dependent Magnetic Properties", Journal of Physical Chemistry Part B, vol. 110, No. 31, (Jul. 19, 2006), pp. 15218-15223, XP093203384.
Xue et al., "Architectural Design of Self-Assembled Hollow Superstructures", Advanced Materials, VCH Publishers, DE, vol. 31, No. 38, (Sep. 5, 2018), XP071874391. (16 pages).
Yu et al., "The Design and Synthesis of Hollow Micro-/ Nanostructures: Present and Future Trends", Advanced Materials, VCH Publishers, DE, vol. 30, No. 38, (Jul. 15, 2018), XP071872156. (27 pages).
Office Action (Notice of Reasons for Refusal) issued on May 27, 2025, in corresponding Japanese Patent Application No. 2023-528339 and English translation of the Office Action. (9 pages).

* cited by examiner a. Casein protein b. Fish spurm DNA c. Micrococcus cells

ALL-SCALE SELF-ASSEMBLY AND PRECISE POSITIONING OF SUPRAPARTICLES

GOVERNMENT CLAUSE

This invention was made with government support under grant number DMR-1810485 award by the National Science Foundation (NSF). The government has certain rights in this invention.

TECHNICAL FIELD

The present disclosure generally relates to a method of assembling building blocks into supraparticles, and more particularly, a method of assembling microscopic building blocks or nanoparticles into supraparticles.

BACKGROUND

The ability to self-assemble individual building blocks into ordered supraparticles is a phenomenon known in natural systems (e.g., proteins) to gain new functionalities. Modulating the self-assembly of supraparticles in a precise and controlled manner will not only help in realizing their potential applications, but will also advance the fundamental understanding of self-assembly in nature. Despite its recent developments, creating a universal, scalable, and robust self-assembly method of supraparticles at scales ranging from nano- to macroscopic lengths remain elusive. Current approaches are usually size-limited, require chemical modifications of building blocks and tedious fabrication procedures, and significantly differ based on the utilized building blocks. Emulsion-based self-assembly strategies are ideal for superstructuring because of their simplicity and unnecessity of chemicals modifications. However, their long-standing downsides comprise of the polydisperse size distribution of emulsion droplets, the nuisance caused by employing emulsifiers (e.g., surfactants), and the difficulty in accurate positioning because of their unfixed fluid properties, which overall hinder governing the size, uniformity, and applications of the self-assembled supraparticles.

SUMMARY

In accordance with one embodiment, a method of assembling building blocks into supraparticles, the method comprising: applying a first solvent on a template of patterned recessed regions to wet surfaces of the recessed regions; applying a second solvent on the template of patterned recessed regions, the building blocks suspended in the second solvent; wherein the first solvent and the second solvent are partially miscible, resulting in negligible interfacial surface tension between the first and second solvents; and wherein droplets of the second solvent diffuse droplets of the first solvent in the recessed regions, thereby assembling the building blocks into the supraparticles in the recessed regions.

In accordance with another embodiment, a solvent system comprising: a first solvent, the first solvent being 1-butanol, a second solvent, the second solvent being water; building blocks configured to be suspended in the second solvent and to be assembled into supraparticles, the building blocks being selected from a group consisting of $SiO_2$ nanoparticles, $Fe_3O_4$ nanoparticles, polydopamine (PDA) nanoparticles, gold nanoparticles, CdTe quantum dots, FeOOH nanorods, and $Fe_2O_3$ nanodiscs; and wherein a solubility between the first solvent and the second solvent is 0.5 wt. % to 35 wt. %.

BRIEF DESCRIPTION OF THE DRAWINGS

FIGS. 7a-7b are illustrations of tuning the shape of supraparticles under an external magnetic field, wherein FIG. 7a is optical and SEM images of the shape evolution of assembled $Fe_3O_4$ supraparticles from a quasi-spherical to ellipsoidal structure by changing the intensity of the applied magnetic field, and FIG. 7b is an SEM image of a one-dimensional (1D) and head-to-tail chain of the ellipsoidal supraparticles under the magnetic assembly.

FIGS. 9a-9d are illustrations of supraparticle assembling within various templating holes, wherein FIGS. 9a-9c are SEM images of $SiO_2$ supraparticles assembled in the cylindrical, cylindrical-dimer, and inverted pyramid microhole-array film, respectively, which is also suitable for FIG. 9d, the cylindrical trimer and tetramer microhole-array film, and the microhole-array with an irregular shape, and wherein the irregular shape of the microholes in FIG. 9d evolved from the cylindrical tetramer microholes when their inner walls were breaking.

DETAILED DESCRIPTION

Figures 1A, 1B, 1C, 1D, 1E:
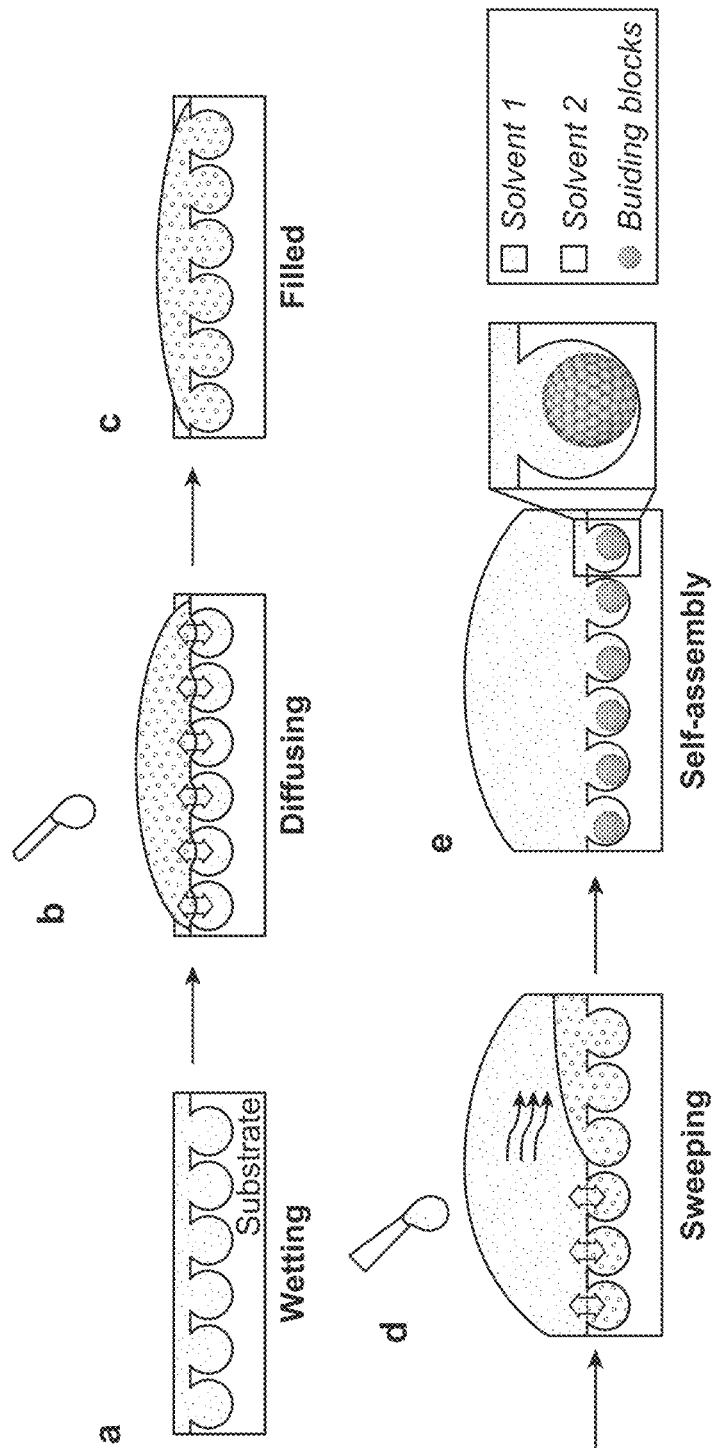
FIGS. 1a-1e is a schematic illustration of the self-assembly of supraparticles within the recessed regions based on two kinds of partially miscible solvent.
Figures 2A, 2B, 2C, 2D, 2E, 2F, 2G, 2H:
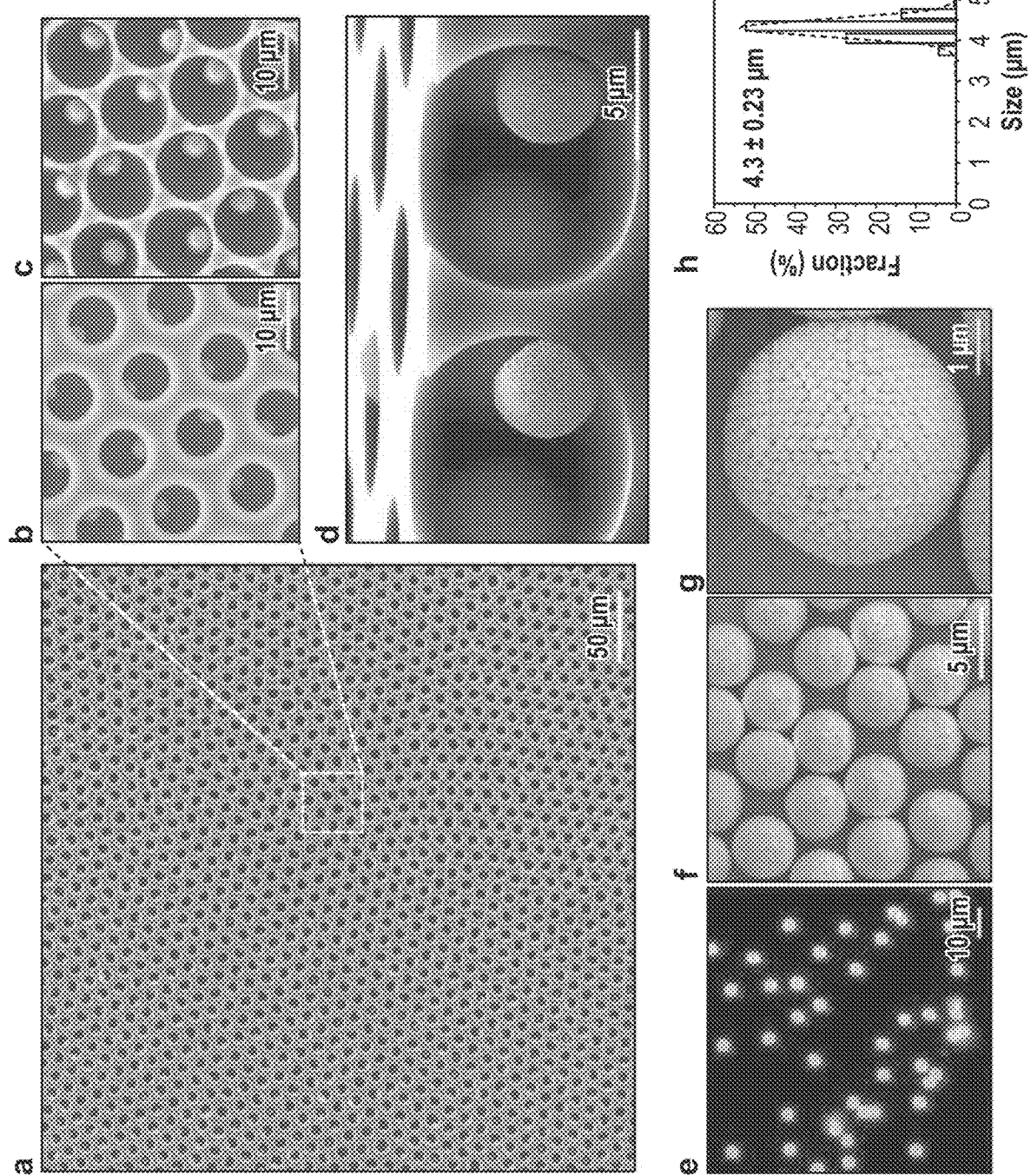
FIGS. 2a-2h are SEM images of supraparticles confined within the template micro-holes (FIGS. 2a and 2b), uncovered by partially etching the template surface using oxygen plasma treatment (FIG. 2c), SEM image of supraparticles in a cross-sectional view (FIG. 2d), dark-field optical image (FIG. 2e), SEM images of the collected supraparticles after removing the template (FIGS. 2f and 2g), and the corresponding size distribution of the supraparticles (FIG. 2h).
Figures 3A, 3B, 3C, 3D, 3E, 3F, 3G, 3H:
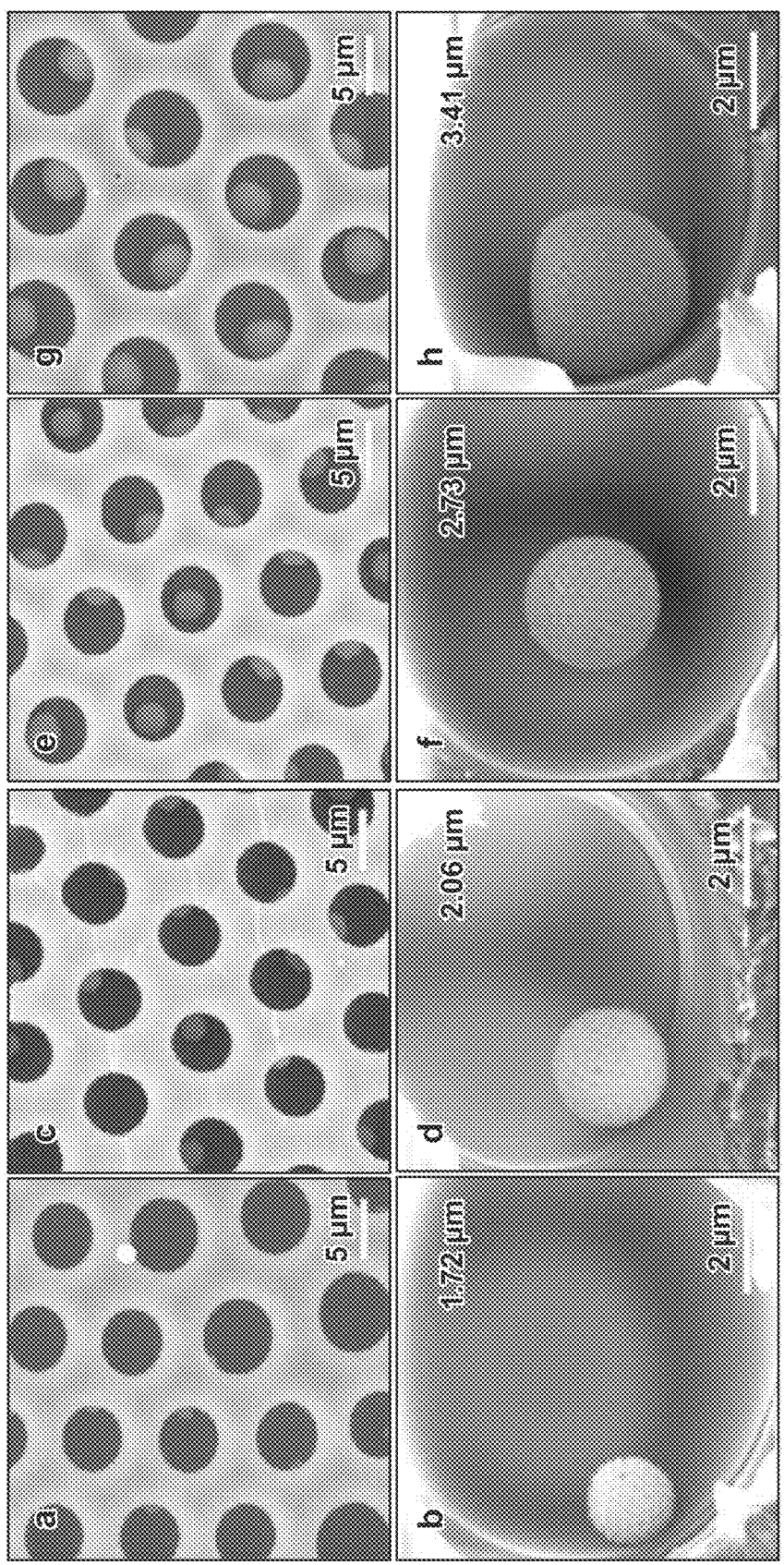
FIGS. 3a-3h are illustrations of tuning the size of the assembled supraparticles by increasing the nanoparticle concentration in the solution.
Figures 4A, 4B, 4C, 4D, 4E:
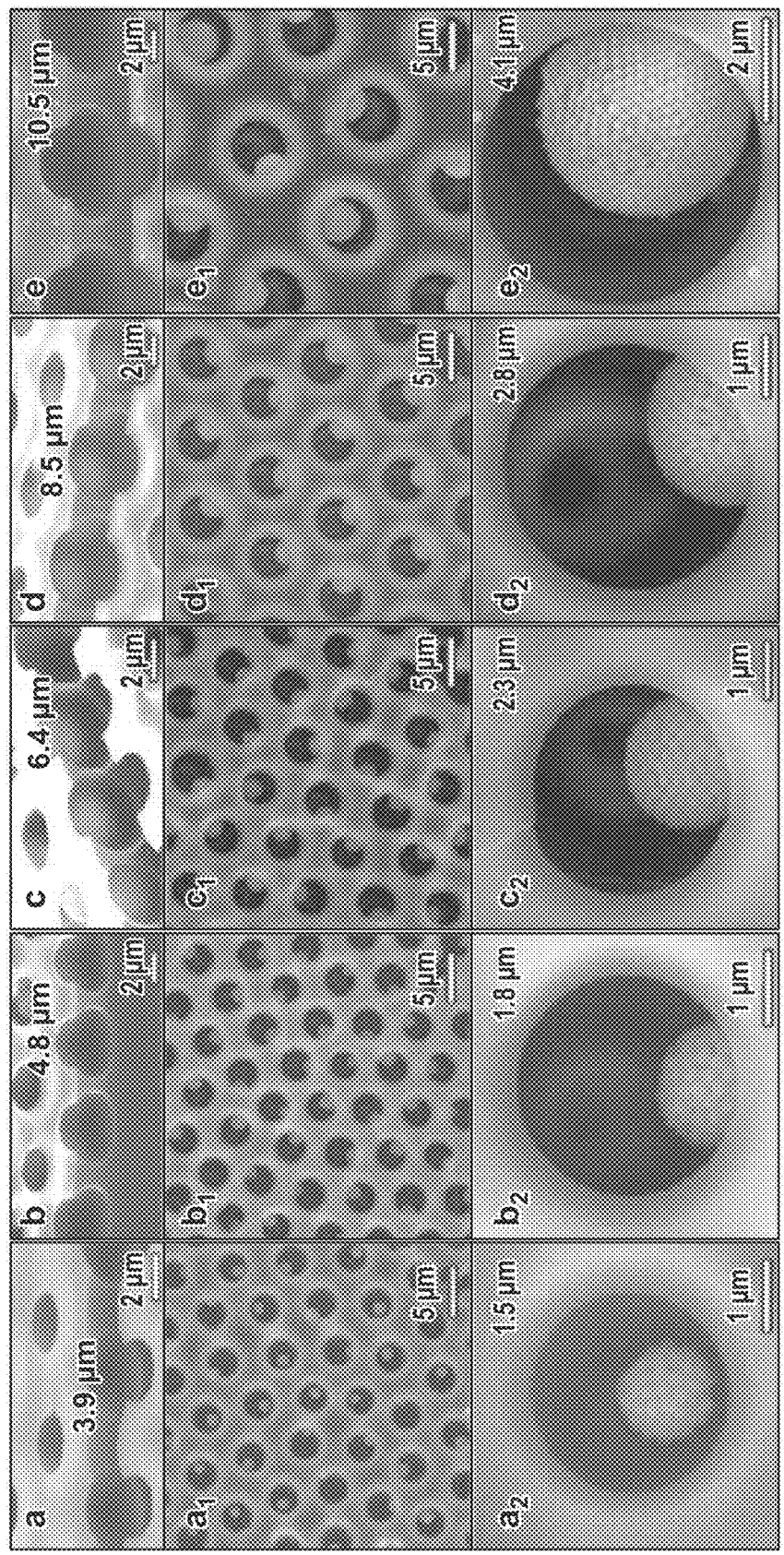
FIGS. 4a-4e are illustrations of tuning the size of the assembled supraparticles by increasing the size of the microholes in the template.

This presented disclosure relates to a method for all-scale self-assembly of supraparticles and realizing their precise positioning in recessed regions based on two or more kinds of solvents with a partial miscibility, for example, water into butanol or pentanol. By taking advantage of the partial miscibility of these solvents, transient emulsion droplets containing the target building blocks can be generated in recessed regions patterned on a substrate.

In accordance with one embodiment, for example, diffusion of water into 1-butanol depletes the emulsion droplets and drives the self-assembly of the building blocks within the templates, producing well-defined supraparticles with the positional order defined by the template. Moreover, an external stimulus (e.g., magnetic or electric fields) can be applied to tune the assembly process. This method is relatively simple, time saving, low-cost, scalable and versatile, which are crucial advantages, for example, for the future development of advanced precision manufacturing. The supraparticles, for example, can be used for electronic displays, display panels, semiconductor devices, electronic devices, drug carriers and biosensors, for nanoscale fabrication of protein chips, cell sorting, and/or an energy production and storage material.

In accordance with another embodiment, the disclosure describes a method for producing supraparticles and precisely positioning in designed recessed regions based on two or more solvents with partial miscibility. Here, the partial miscibility of the two more solvents can be defined as solvents that can be partially miscible with each other. The solubility between the solvents can be, for example, in the range from 0.5 wt. % to 35 wt. %, and more preferably, 15 wt. % to 30 wt. %, such as, but not limited to, for example, to water in 1-butanol (20.1 wt. %), etc.

In accordance with one embodiment, the solubility between the solvents can be critical to forming the transient emulsion droplets containing the target building blocks. For example, a too high solubility will mix the first and second solvents relatively quickly without the formation of the transient emulsion droplets. Alternatively, a too low solubility will also make it difficult to form the emulsion droplets because the first and second solvents prefer to remain in separate phases.

In addition, for the building blocks (e.g., nanoparticles), including both magnetic and nonmagnetic building blocks, the loss of (the second) solvent (by diffusing into the first solvent) drives the aggregation of the building blocks.

In addition, the building blocks are preferably only dispersible in the second solvent but not in the first solvent. Thus, when the second solvent diffuses into the first solvent, the building blocks lose their colloidal stability and thus aggregate since the building blocks are not dispersible in the first solvent.

FIGS. 1a-1e shows a schematic representation of the self-assembly and positioning procedure based on two partially-miscible solvents. The detailed steps of this method are described below.

Step 1:
As shown in FIG. 1a, one of the pure solvents (hereinafter "a first solvent") was firstly introduced into a substrate to wet and fill a plurality of recessed regions in the substrate. The first solvent can be introduced into the substrate by, for example, dropping, dipping, or wetting, etc. The plurality of recessed regions can be, for example, holes and grooves in a form of an array and/or an irregular pattern. The size of the recessed regions is not limited to any particular size, and should be, for example, larger than or equal to the size of the building blocks, (e.g. solid particles). The plurality of recessed regions can be fabricated on the substrate, for example, by conventional lithography strategies, imprinting strategies, a breath figure method, etc.

Step 2:
Building blocks are dispersed and suspended in a second solvent (hereinafter a "second solvent"). The building blocks can include, but are not limited to, solid particles, polymers, molecules, ions, etc. The size of the building blocks, for example, can range from atomic to micrometer. In accordance with an embodiment, one of the two solvents is considered as the suspension solvent of the solid particles, and preferably, the solvent with better dispersion of building blocks is selected as the suspension solvent. Mechanical vibration or agitation and/or sonication, for example, can be used to improve the dispersion of building blocks in the suspension solvent (i.e., second solvent).

Step 3:
The second solvent with the suspension of building blocks is then introduced into substrate, as shown in FIG. 1b. Due to the partially miscible property of the first and second solvents, the first solvent existing in the plurality of recessed regions will be replaced and filled with the suspension solvent, for example, the second solvent, as shown in FIG. 1c. The second solvent can be introduced onto the substrate, for example, by dropping, dipping, and wetting, etc. In accordance with an embodiment, the volume of the second solvent is at least twice the volume of first solvent remaining on the substrate. The replacing process occurred in the plurality of recessed regions can be due to the first solvent being diffused into a second solvent phase, and the consumed time for this replacing process can vary from milliseconds (ms) to days (d), which is determined by the solubility of the first and second solvents with each other.

Step 4:
A relatively large amount of the first solvent in a pure form (e.g., pure first solvent) can be used as a sweeping solvent, which is then introduced onto the substrate to remove the surplus second solvent on the substrate surface.

The removal of the surplus second solvent on the substrate can lead to the formation of droplets of the second solvent being isolated in each of the plurality of recessed regions by the first solvent, for example, as shown in FIG. 1d. In accordance with an embodiment, the volume of pure first solvent should be at least five times the volume of the second solvent used in Step 3, in order to help ensure that the surplus second solvent is totally removed. The relatively large amount of pure first solvent, for example, can be introduced by dropping, dipping, washing, etc.

Step 5:
By taking advantages of the partial miscibility of the first and second solvents, the droplets of the second solvent formed in the recessed regions will diffuse into the first solvent phase until the droplets of the second solvent disappear. In accordance with an additional embodiment, the building blocks suspended in droplets of the second solvent are encapsulated and thus assembled in the recessed regions during the diffusion process. The time for the droplets of the second solvent to diffuse into the first solvent can be, for example, from milliseconds (ms) to hours (h), which is determined by the solubility of the first solvent and the solvent with each other. The amount of the building blocks in each of the plurality of recessed regions can be tunable, for example, by varying the concentration of building blocks suspended in solvent and/or the size of recessed region used as the template. The building blocks compacted in the recessed region can be, but not limited to, in a form of spherical structure (FIG. 1e), ellipsoidal structure closely packed by solid particles, colloidosomes, bio-structures, crystals, or in a form of irregular placement of solid particles.

In accordance with another embodiment, an external stimulus, for example, a magnetic or electric fields, can also be applied during above diffusion process to assist the assembly and positioning of supraparticles within the recessed regions. The magnetic field can be used to distort the shape of the supraparticles.

Example 1: Assembling Solid Particles into Supraparticles within the Honeycomb Hole-Array Films Based on Water/1-Butanol System According to Young-Laplace law, the Laplace pressure inside an emulsion droplet can be determined by the interfacial surface tension of the droplet divided by the radius of the droplet. As water and 1-butanol display a partially miscible system, the interfacial surface tension between water and 1-butonal can be considered negligible during the emulsification. In accordance with a further embodiment, this negligible surface tension allows for a relatively simple and precise modulation of the emulsion droplets size within the recessed region (e.g., hole) of the template by endowing a minimum external force to the system (e.g., the fluid-shear force induced by sweeping with 1-butanol). The negligible Laplace pressure inside the emulsified droplets keeps the emulsified droplets from coalescing and breaking and without the need for emulsifiers. These features are key for the self-assembly of supraparticles at the demonstrated wide-range dimensions, which can also provide significant advantages when compared with other immiscible emulsion-based self-assembly methods. For example, a microfluidic self-assembly, which is based on a miniaturized channel chip to manipulate the fluid emulsification, requires relatively complex set-ups, and suffers from relatively low yields and time-consuming operation, and obligates applying high pressure of microflows and narrowing micro-channels to decrease the emulsion droplets size into several micrometers. Furthermore, surfactants are needed to help prevent these immiscible emulsion systems from coalescing, which can present potential toxicity to the system if it is intended for biological applications.

A water/1-butanol system was employed as the partially miscible solvents. The solubility for water in 1-butanol and 1-butanol in water are 20.1 wt. % and 7.7 wt. % at 25° C., respectively. The honeycomb hole-array films with hexagonally packed structure can be obtained by a breath figure method, in which the size of the quasi-spherical holes at a micrometer scale. Solid particles with spherical shape, for example, at a nanometer scale can be used, and the solid particles are preferably well dispersed in water phase. FIGS. 2a-2h illustrate the results of the self-assembly of supraparticles in the honeycomb hole-array films based on the water/1-butanol system.

Figure 5:
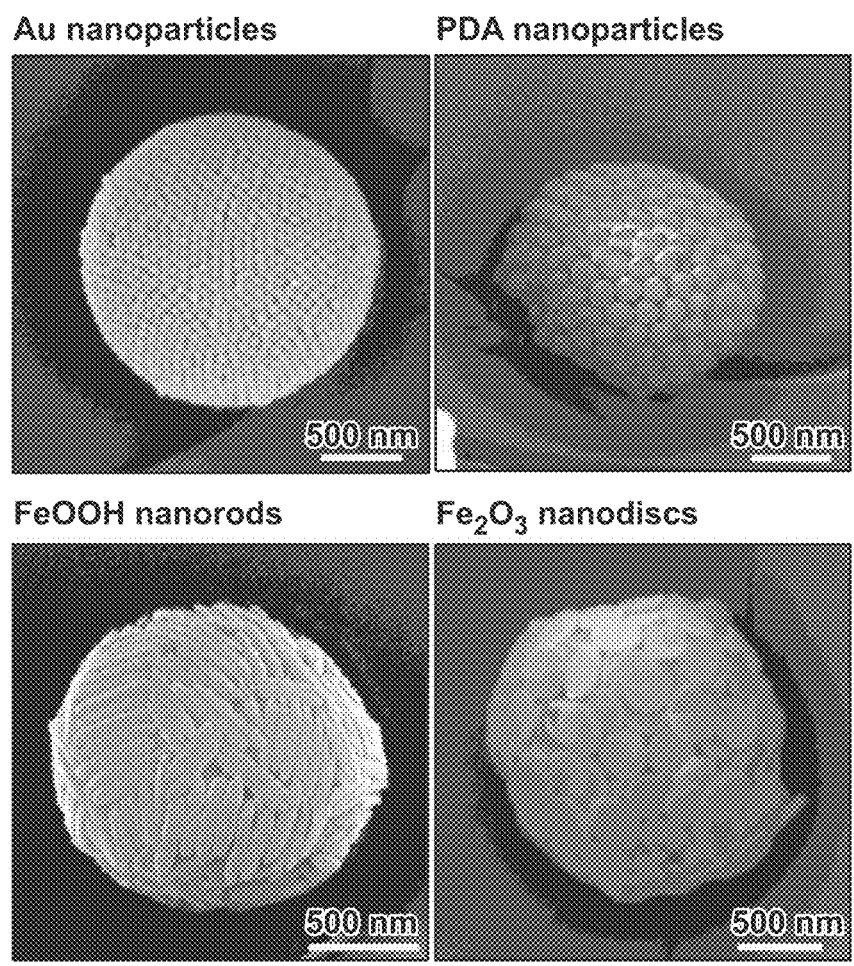
FIG. 5 are SEM images of supraparticles constructed by different nanostructured materials with various shapes and compositions as building blocks.
Figure 6:
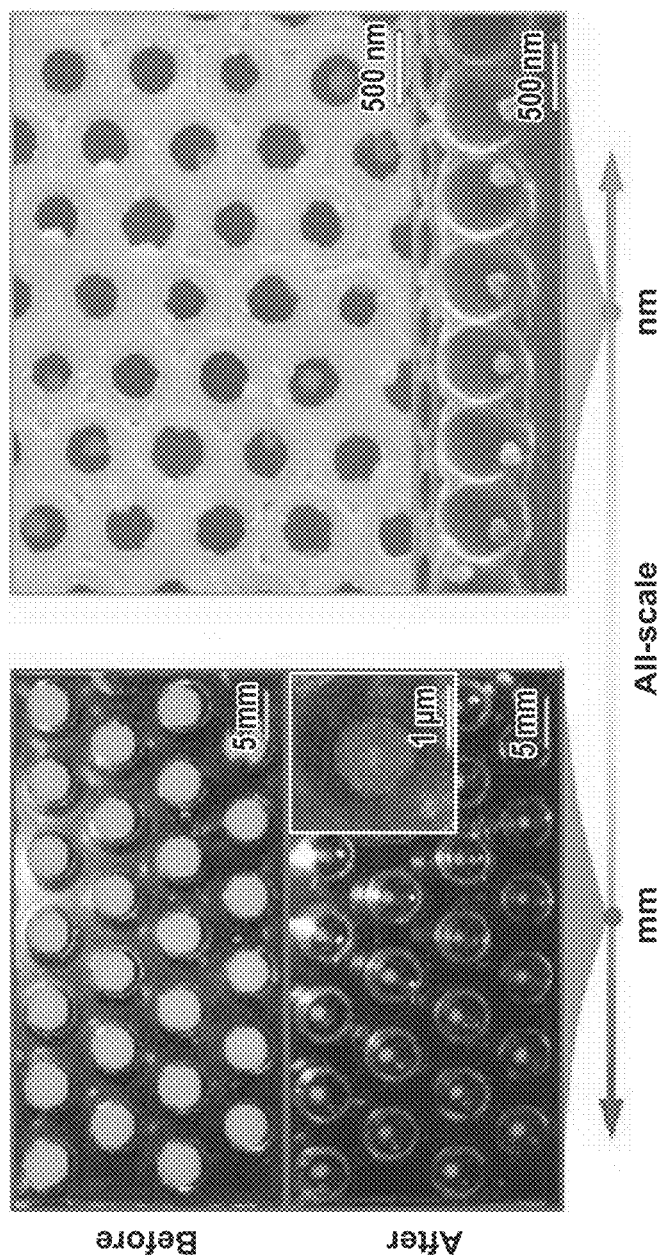
FIG. 6 is an illustration of the self-assembly of supraparticles ranging from millimeter (right) to nanometer (left).

As shown in FIGS. 2a-2h, the supraparticles formed in the holes of the honeycomb hole-array film exhibit a well-ordered spherical structure. FIGS. 3a-3h and FIGS. 4a-4e illustrate that the size of the assembled supraparticles can be tuned by varying the concentration of solid particles in a water phase and by varying the hole size in honeycomb hole-array film, respectively. FIG. 5 illustrates the self-assembly of supraparticles by using various types and shapes of building blocks, which demonstrates a wide range of versatility. FIG. 6 illustrates the results of the self-assembly of supraparticles with size ranging from nanometer to millimeter, which indicates that the disclosed method can be employed to prepare supraparticles at all scales, by directly controlling the size of the templates and the concentration of the building blocks.

Example 2: Assembling Supraparticles Under an External Field

Figures 7A, 7B:
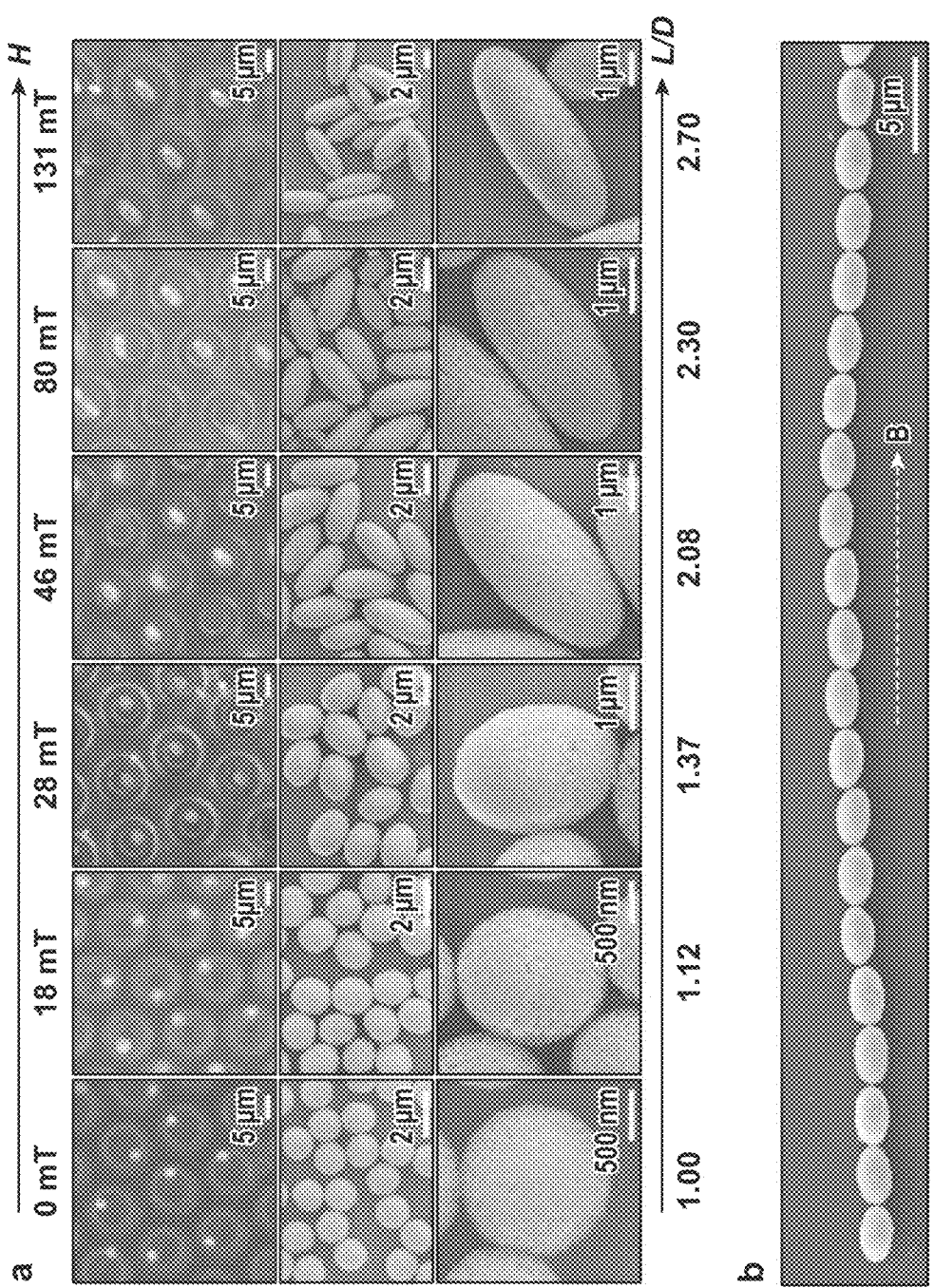
Figures 8A, 8B, 8C, 8D:
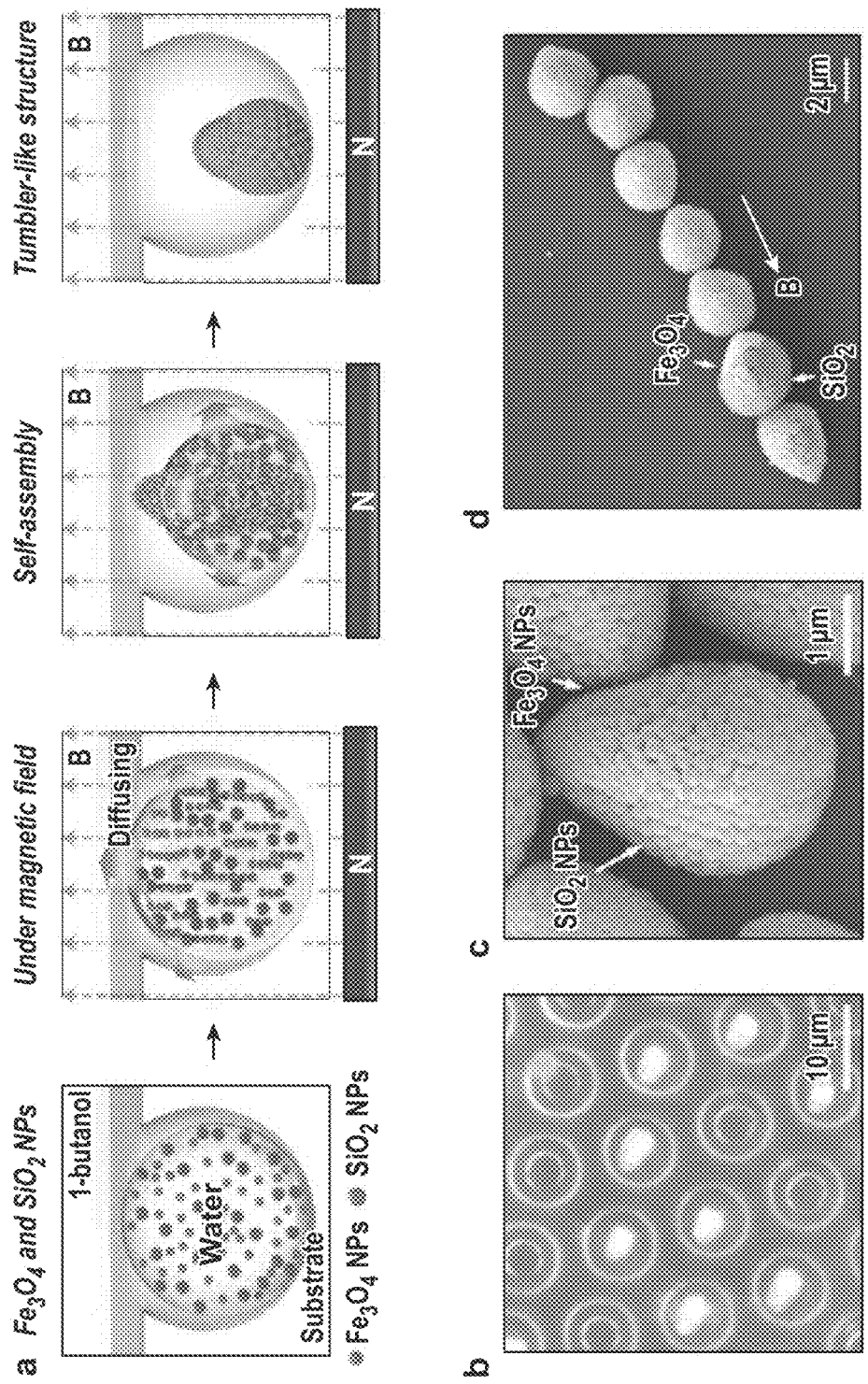
FIGS. 8a-8d are schematic illustration of the self-assembly mechanism of the tumbler-like supraparticles under the magnetic field (FIG. 8a), an optical image (FIG. 8b) and SEM image (FIG. 8c) of the tumbler-like supraparticles of $SiO_2$ and $Fe_3O_4$ nanoparticles as building-blocks, and an SEM image of a one-dimensional (1D) and head-to-tail chain of the tumbler-like supraparticles aligned along the magnetic field (FIG. 8d).

In accordance with another embodiment, when the building blocks can respond to the external stimulus, such as, but not limited to, magnetic particles that can respond to magnetic field, the external stimulus can be used to tune the shape of the assembled supraparticles within the recessed regions. For example, the water/1-butanol system was selected as the partially miscible solvents, and magnetic nanoparticles (e.g. $Fe_3O_4$) dispersed in water phase were used. In accordance with an embodiment, an external magnetic field was vertically applied across the substrate during the entire process. The transition from quasi-spherical to ellipsoidal supraparticles can be achieved by assembling magnetic $Fe_3O_4$ nanoparticles in an external magnetic field with increasing field strength, as shown in FIG. 7a. The elongation of the ellipsoidal supraparticles is driven by the assembly of magnetic nanoparticles into one-dimensional (1D) chains along the field direction inside the emulsion droplets, with a larger aspect ratio (L/D, length to diameter) in a relatively stronger field (FIG. 7a). When released from the template and re-dispersed in 1-butanol, these ellipsoidal supraparticles remain structurally stable and can be further aligned into a series of 1D long and head-to-tail chains along the magnetic field, as shown in FIG. 7b. Moreover, the combination of magnetic and non-magnetic nanoparticles offers an opportunity to alter the supraparticles, for example, from an ellipsoid to a tumbler-like shape. FIGS. 8a-8d illustrate tumbler-like supraparticles from a mixture of $Fe_3O_4$ nanoparticles (115±27 nm) and $SiO_2$ nanoparticles (220±16.7 nm) assembled under magnetic field in accordance with one embodiment.

Example 3: Assembling Supraparticles within Different Templating Holes

Figures 9A, 9B, 9C, 9D:
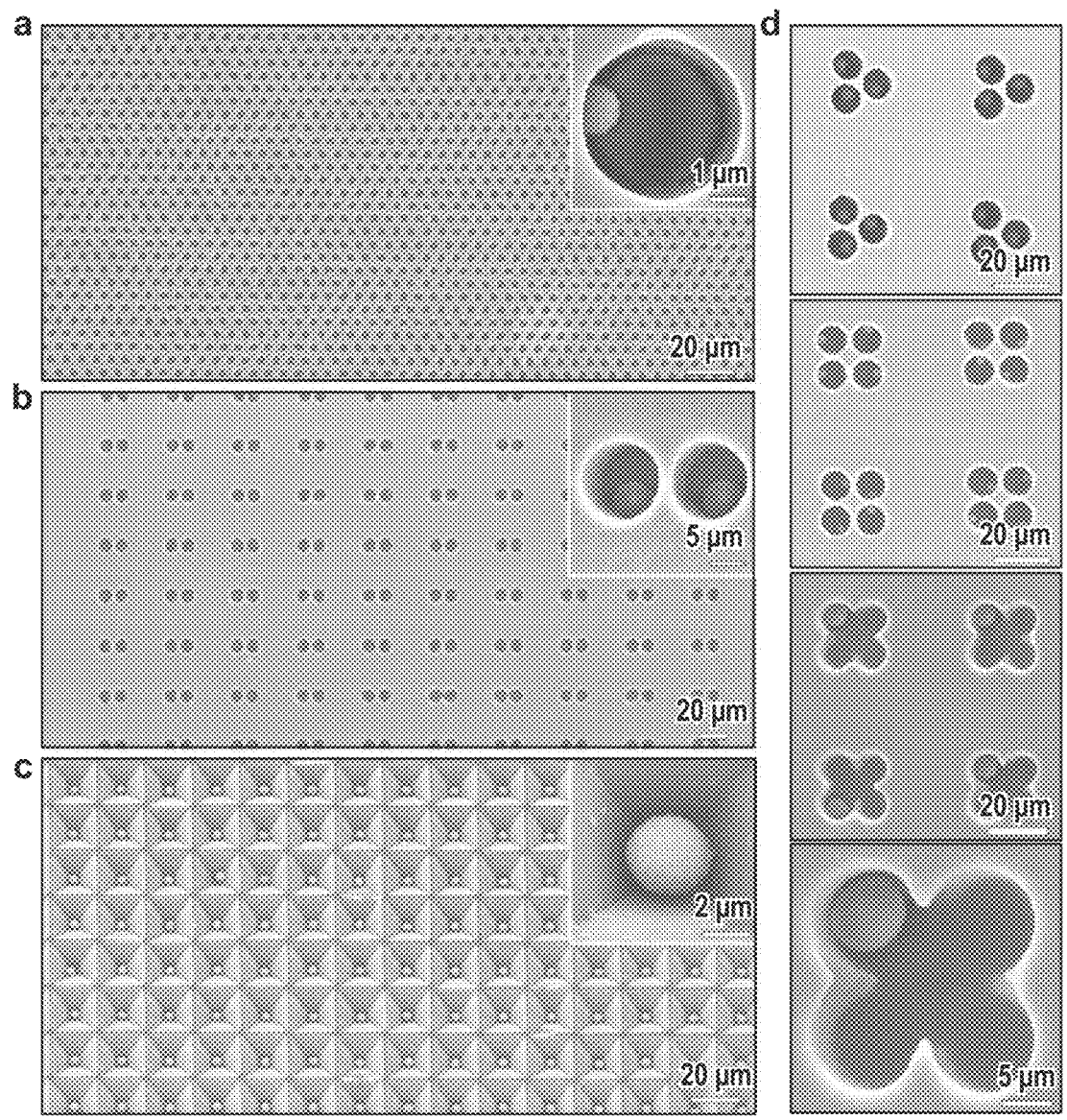
Figures 10A, 10B, 10C, 10D, 10E, 10F:
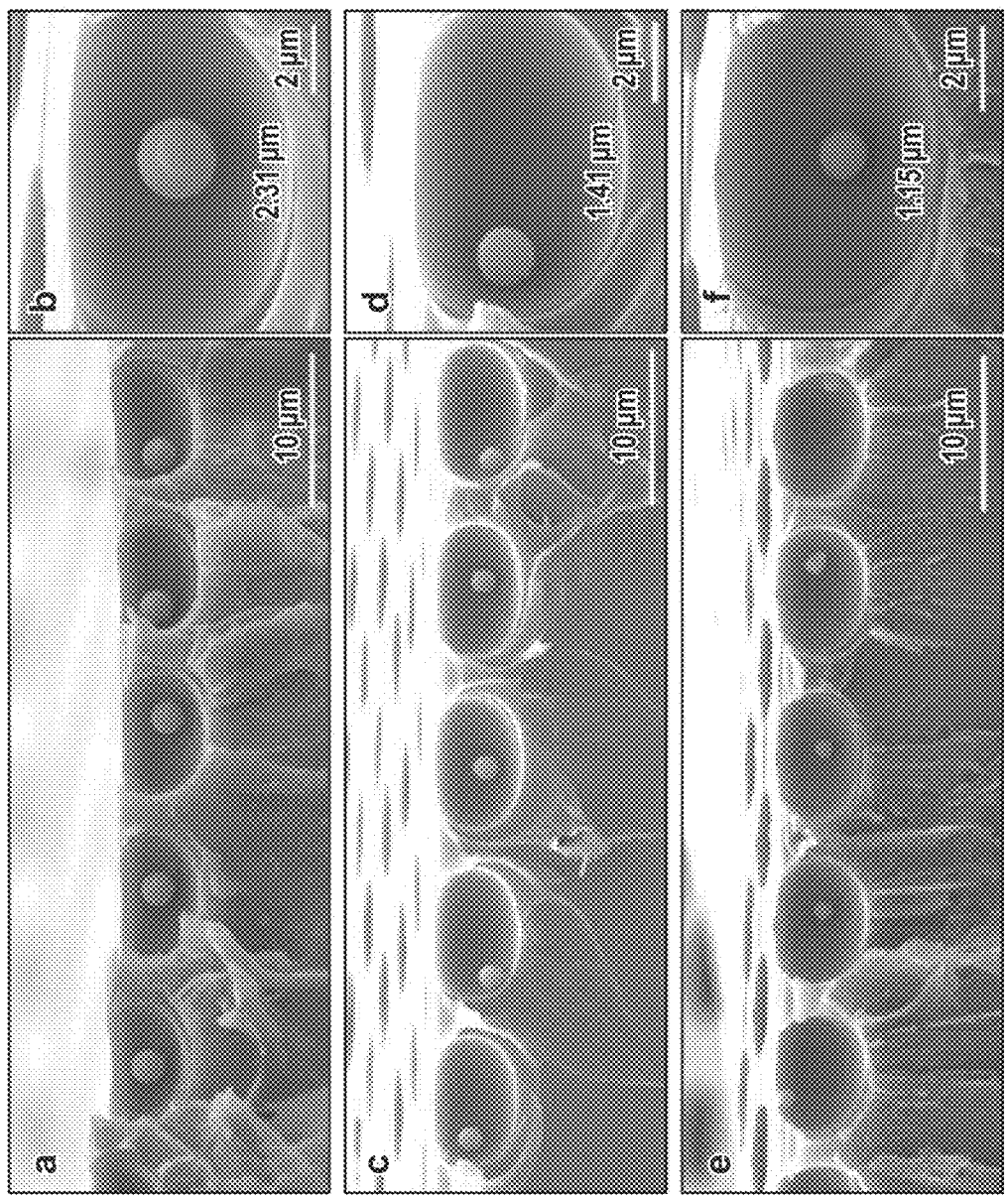
FIGS. 10a-10f are illustrations of assembling chitosan supraparticles with different sizes by decreasing the concentration of the chitosan monomers.
Figure 11A:
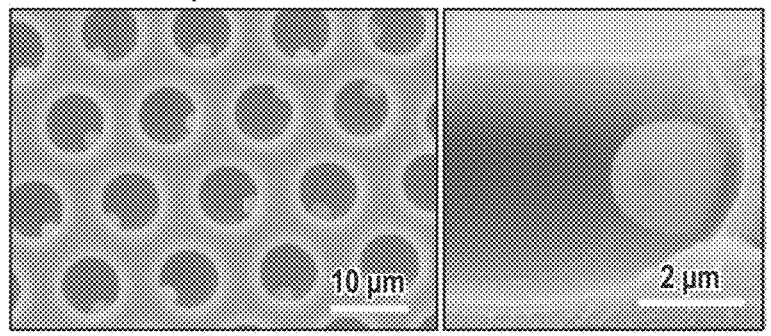
FIGS. 11a-11c are illustrations of supraparticles assembled from biological building blocks, including casein proteins (FIG. 11a), fish sperm DNA (FIG. 11b), and cells of *Micrococcus lysodeikticus* (FIG. 11c).
Figure 11B:
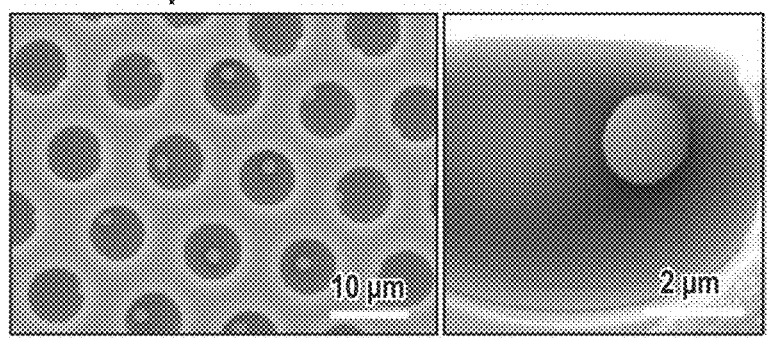
Figure 11C:
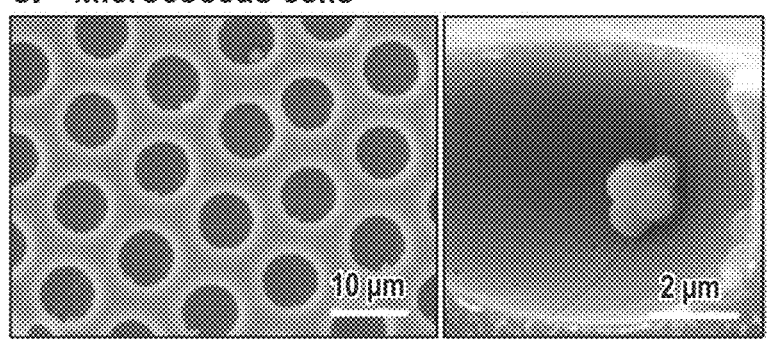

Aside from the above honeycomb hole-array film, the method and system as disclosed is also suitable for various shapes of hole-array films, for example, cylindrical (FIG. 9a), cylindrical-dimer (FIG. 9b), inverted-pyramid (FIG. 9c), and even irregular hole shapes (FIG. 9d). In accordance with an embodiment, despite differences in morphology and periodicity, similar supraparticles have been successfully assembled in all micro-hole-array films. For example, almost all of the supraparticles were preferentially deposited at the inner boundaries of the micro-hole walls to effectively reduce their surface energies. For example, the supraparticles were deposited at the bottom tip of the inverted pyramid holes where the lowest potential energy attained (FIG. 9c). Thus, the results demonstrate an effective strategy for preferentially depositing the supraparticles into targeted positions, which only requires pre-designing the hole-arrays.

Example 4. Assembling Supraparticles from Molecular and Ionic Building-Blocks

In addition, solid particles, biopolymer molecules (e.g., chitosan, casein proteins, fish sperm DNA, and live *Micro-* coccus cells) can also be self-assembled into unique supraparticles employing the same method as disclosed above. (FIGS. 10a-11c).

Figures 12A, 12B, 12C:
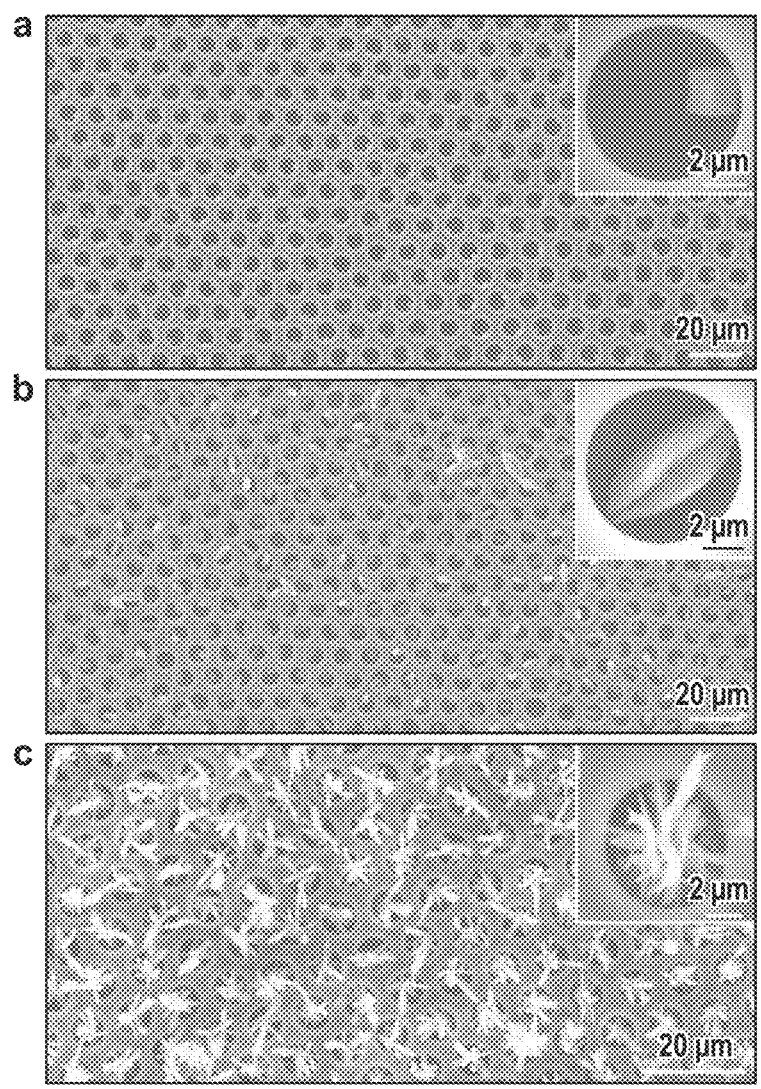
FIGS. 12a-12c are illustrations of supraparticles assembled from Ions, wherein the growth of the cube-like micro-crystals of the sodium chloride (NaCl) (FIG. 12a), the 'rice-like' micro-crystals of the sodium sulfite ($Na_2SO_3$) with a long crack in the middle (FIG. 12b), and the 'flower-like' micro-crystalline sodium sulfide (Na2SO4) (FIG. 12c).
Figures 13A, 13B, 13C, 13D, 13E:
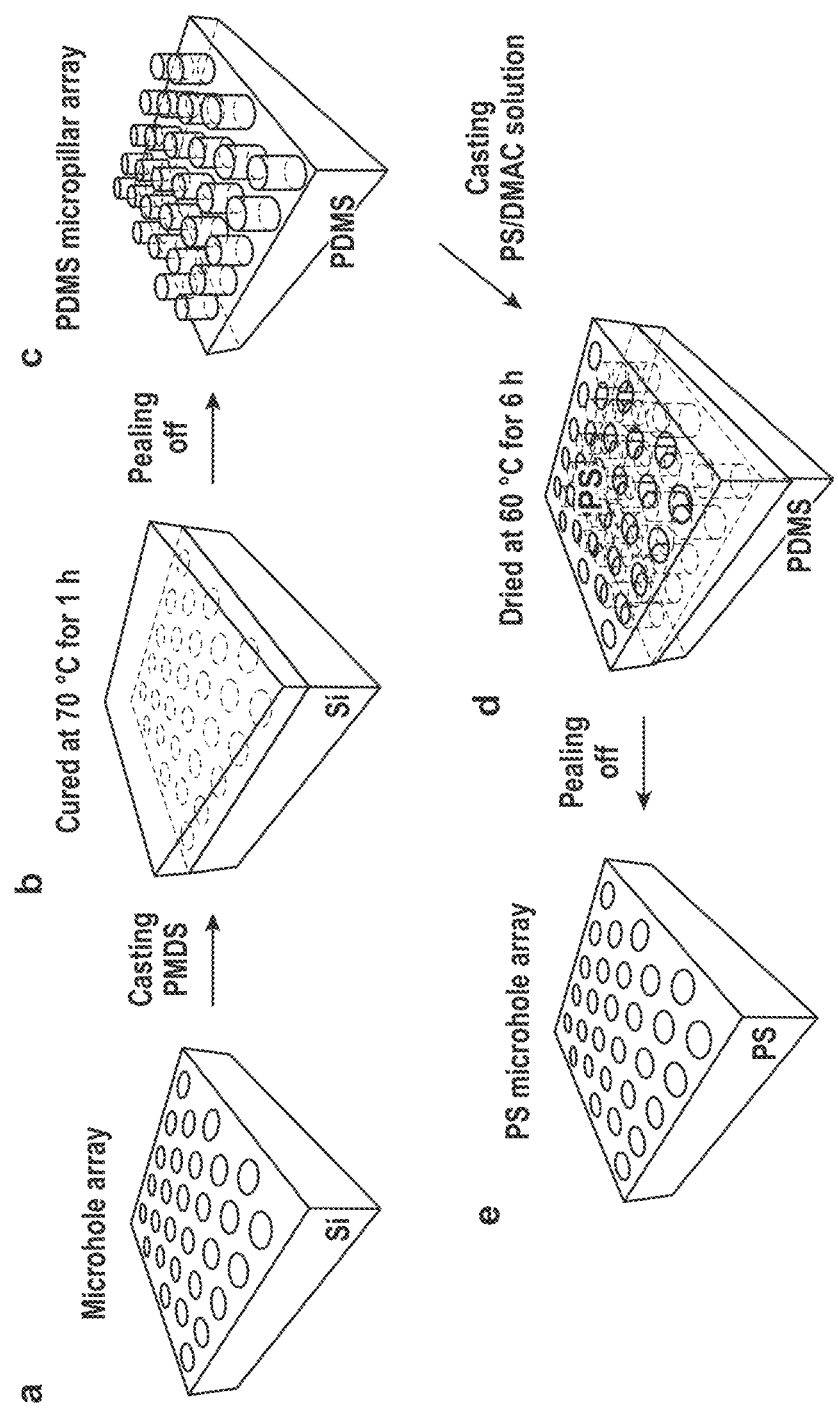
FIGS. 13a-13e is an illustration of the fabrication of a microhole-array PS film replicated from a Silicon wafer via a PDMS soft lithograph strategy.

Moreover, this superstructuring strategy is not limited to the self-assembly of nanostructures or polymeric molecules, but can also be applied to the growth of crystals of ionic compounds in the confined space provided by the template. FIGS. 12a-12c illustrates the growth of "cube-like" micro-crystals of NaCl, "rice-like" micro-crystals of $Na_2SO_3$, and "flower-like" micro-crystals of $Na_2SO_4$, representing the cubic, monoclinic, and orthorhombic lattice systems, respectively.

The ability to deposit the supraparticles at specified locations present a unique property for certain technologies, for example, biosensor functionalization, nanoscale fabrication of protein chips, and cell sorting. To position the supraparticles at the targeted spaces, a transfer process is generally required in other supraparticles self-assembly methods by complicated techniques (e.g., AFM, lithography), which process becomes typically harder with the nanoscale sizes of supraparticles and damage the supraparticles with limited positioning accuracy and yields.

In accordance with a further embodiment, the disclosed method based on partially-miscible solvents provides a relatively low-cost and relatively high-throughput method for building uniform supraparticles. The disclosed method also guarantees the accurate positioning of the supraparticles inside the predefined spaces without any structural damage. With the high controllability of the supraparticle size, the applicability to building blocks of a wide range of dimensions, compositions and morphologies, and the ability of assembling all scales, this strategy can have significant impacts not only on materials science but also on many other fields such as data storage, bio- and chemical sensing, and biomedicine.

Synthesis of Nanoparticles

Synthesis of $SiO_2$ Nanoparticles

The $SiO_2$ nanoparticles can be prepared from a modified Stober method. In accordance with an embodiment, synthesis of $SiO_2$ nanoparticles with a size around 220 nm, 0.86 mL of Tetraethyl orthosilicate (TEOS), 28 mL of ethanol, 4.3 mL of water, and 0.65 mL of ammonia ($NH_4OH$, 28%) solution can be mixed. This mixture was reacted for 4 hours at room temperature under magnetic stirring. The $SiO_2$ nanoparticles can be collected by centrifugation, washed with water and ethanol several times, and finally re-dispersed in water for further use.

Synthesis of $Fe_3O_4$ Nanoparticles

The $Fe_3O_4$ nanoparticles can be prepared through a hydrolysis process in diethylene glycol (DEG) solution at high temperature under nitrogen atmosphere protection. Firstly, 50 mmol of NaOH powder was dissolved into 20 mL of DEG by heating at 120° C. for 1 h under nitrogen atmosphere to obtain a NaOH/DEG stock solution. This mixture was kept at 70° C. for storage. For the synthesis of $Fe_3O_4$ nanoparticles around 115 nm[3], a mixture of poly(acrylic acid) (PAA, 4 mmol), iron chloride ($FeCl_3$, 0.4 mmol), and DEG (17 mL) was heated to 220° C. for 30 min under vigorous stirring, then 1.85 mL of the NaOH/DEG stock solution was quickly injected into the hot mixture. After a further reaction at 220° C. for 1 hour, $Fe_3O_4$ nanoparticles with a relatively large size were obtained. For the synthesis of $Fe_3O_4$ nanoparticles around 10 nm[4], a mixture of PAA (4 mmol), $FeCl_3$ (2 mmol), and DEG (10 mL) was heated to 220° C. for 30 min. After that, 4.5 mL of the NaOH/DEG stock solution was quickly added into the hot mixture. After 10 min of the reaction, another volume of the $FeCl_3$ (2 mmol) and NaOH/DEG stock solution (3 mL) was quickly injected into the above hot mixture. After another 15 min of reaction, $Fe_3O_4$ nanoparticles with a relatively small size were obtained. Both of the final products were collected by centrifugation, repeatedly washed with ethanol and water several times, and then re-dispersed in water for further use.

Synthesis of Polydopamine (PDA) Nanoparticles

For the synthesis of the PDA nanoparticles at around 200 nm, 2 mL of $NH_4OH$ (28%), 40 mL of ethanol, and 90 mL of water can be mixed under mild stirring at room temperature for 30 min. After that, 0.5 g of dopamine hydrochloride dissolved in 10 mL of water was injected into the above mixture, and then reacted for 48 hours in the air at room temperature. The PDA nanoparticles can be collected by centrifugation, washed with water for three times, and re-dispersed into the water for further use.

Synthesis of Gold Nanoparticles

A mixture of 0.035 mL of chloroauric acid ($HAuCl_4$, 1 M), 1.4 mL of poly(diallyldimethylammonium) chloride (PDDA), 0.35 mL of hydrochloric acid (HCl), and 70 mL of Ethylene glycol (EG) in a glass vial was sealed in a glass vial and reacted in an oil bath at 220° C. for 30 min without any stirring. After the reaction, the above mixture containing the Au nanocrystal colloid was naturally cooled into room temperature, and then another volume of $HAuCl_4$ solution (with a molar ratio of 1:40 for $AuCl_4^-$ ions to Au NPs) was added to remove the corner and the sharper edge of the Au nanocrystals. The final Au nanoparticle products can be collected by centrifugation, repeatedly rinsed with water three times, and re-dispersed in water for further use.

Synthesis of Water-Soluble CdTe Quantum Dots

The CdTe quantum dots can be prepared with 16 mL of cadmium chloride ($CdCl_2$, 0.04 M), 400 mg of trisodium citrate dihydrate, 400 mg of sodium borohydride ($NaBH_4$), 4 mL of Sodium tellurite ($Na_2TeO_3$ 0.01 M), 200 mg of Mercaptosuccinic acid (MSA) and 184 mL of water can be mixed in a flask under vigorous stirring. As the above mixture turns to green color, the flask was equipped with a condenser, and the mixture was refluxed under air condition for 5 hours of reaction. The final products can be collected by centrifugation, washed with ethanol and water repeatedly, and re-dispersed in water for further use.

Synthesis of FeOOH Nanorods

A mixture of 0.405 g of $FeCl_3 \cdot 6H_2O$, 4.05 mg of $NaHPO_4$, and 75 mL of water was transferred and sealed in a Teflon autoclave, and then maintained at 105° C. for 48 hours. The final products can be collected by centrifugation, rinsed with water, and re-dispersed into the water for further use.

Synthesis of $Fe_2O_3$ Nanodiscs

The $Fe_2O_3$ nanodiscs can be prepared through an alcohol-thermal reaction as previously reported[10]. Briefly, a mixture of 1.09 g of FeCl$_3$·6H$_2$O, 5 g of sodium acetate, 2.8 mL of water, and 40 mL of ethanol was sealed in a Teflon autoclave, and then maintained at 180° C. for 12 hours. The final products can be washed with water, collected by centrifugation, and re-dispersed into the water for further use.

Fabrication of Various Hole-Array Films as the Template

Honeycomb Microhole-Array Polystyrene (PS) Film:

The honeycomb micro-hole array film was fabricated through a breath figure method. A solid PS (MW≈192 000) was firstly dissolved into chloroform solvent, forming a PS precursor solution with a concentration of 3.0 wt. %. Then, 350 µL of the PS solution was cast on a glass coverslip (18 cm×18 cm) in a sealed vessel. Next, an air gas flow containing water vapor (85% in humidity) with a flow rate of 200 sccm was used to blow-over the PS solution for 10 min at room temperature. As the chloroform solvent evaporated to cool the system, a large number of water droplets can be condensed from the moist flow and then assembled into an ordered array monolayer on the surface of the PS solution. After the complete evaporation of chloroform solvent and the water droplets, a honeycomb micro-hole array film was obtained. The microhole size in the films was tuned by varying the used volume of the PS solution and the condensation time.

Other Microhole-Array PS Films:

The fabrication process for other micro-hole array PS films with different patterns was divided into two steps. The first step was to fabricate the micro-hole array silicon (Si) wafers via a conventional photolithography strategy combined with a further etching process. Briefly, for the cylindrical micro-hole array Si wafers, including the dimer-, trimer-, and tetramer-microhole array, Si wafers can be patterned through the photolithography technique and then etched by a deep reactive-ion etching of SF$_6$ gas. For the inverted pyramid array Si wafer, Si wafer with a 300-nm-thick silicon oxide (SiO$_2$) layer was patterned through the photolithography process and then etched via a wet etching process. More specifically, the SiO$_2$ layer was firstly etched by a buffered oxide etchant (BOE) solution for 6 min, and then the exposed silicon was etched by potassium hydroxide solution (6 wt. %) in a water bath at 90° C. for 1 hour. These above Si wafers can be washed by acetone, ethanol, and water several times.

With these Si wafers as the molds, the second step was designed to replicate them via a PDMS (poly-dimethylsiloxane) soft-lithography strategy. Firstly, these Si wafers can be treated by trimethylchlorosilane (TMCS) vapor for 15 min to avoid the sticking of PDMS mold onto the Si wafers. After that, a mixture of PDMS elastomer and cross-linker with a ratio of 10:1 was cast onto the Si wafers and cured at 70° C. for 1 hour. After that, a PDMS mold with reverse-pattern array was replicated by peeling off from the Si wafers. Based on these PDMS molds, a PS/DMAC (N, N-Dimethylacetamide) solution (5 wt. %) was then cast onto these PDMS molds and dried at 60° C. for 6 hour to completely evaporate the DMAC solvent. Finally, the PS micro-hole array films with corresponding patterns can be fabricated by peeling off from the PDMS molds.

Illustration of the fabrication of the microhole-array PS film replicated from the Silicon wafer via a PDMS soft lithography strategy.

5-mm-Sized Hole-Array Film and 500-nm-Sized Hole-Array Film:

The 5 mm-sized hole-array film was prepared by a 3D printer. The printing precursor was acrylonitrile butadiene styrene (ABS). The 500 nm-sized hole-array film was prepared through a modified in-situ polymerization process at the air-water interface. Briefly, a 2D colloidal crystal monolayer (500 nm of PS nanoparticles) was firstly assembled on the surface of the aqueous pyrrole monomer solution (0.8 wt. % in water) via an interfacial self-assembly method. The system was kept undisturbed for 2 hours to allow the pyrrole monomer to swell the PS nanoparticles. 200 µL of aqueous FeCl$_3$ solution (1 M) was then added to the above system to initiate the polymerization coating of the pyrrole monomer on the water-immersed part of the PS nanoparticle monolayer, which was endured for 24 hours at room temperature. The polypyrrole film with a top-opening nanohole-array was fabricated after removing the PS nanoparticles by tetrahydrofuran (THF). The final product was rinsed with THF and water several times. The micro-hole array polypyrrole films with different periodic structures can be obtained by using different sizes of PS nanoparticles.

Self-Assembly Based on Template-Assisted Emulsion Strategy

The micro-hole array films can be first wetted by 1-butanol. Then, the aqueous solution containing the building-blocks was drop-casted onto the wetted hole-array films (solubility limit of water in 1-butanol is 20.4% w/w at 25° C.). After 5 minutes, a large amount of pure 1-butanol was used to sweep the aqueous solution rapidly. The uniform superstructures can be produced finally within the micro-holes in films. The polymer PS film templates can be removed by heating at 450° C. for 3 hours in air or etched completely by dissolving the film in chloroform.

What is claimed is:

1. A method of assembling building blocks into supraparticles, the method comprising:
   applying a first solvent on a template of patterned recessed regions to wet surfaces of the recessed regions;
   applying a second solvent on the template of patterned recessed regions, the building blocks suspended in the second solvent;
   wherein the first solvent and the second solvent are partially miscible, resulting in negligible interfacial surface tension between the first and second solvents; and
   wherein droplets of the second solvent diffuse droplets of the first solvent in the recessed regions, thereby assembling the building blocks into the supraparticles in the recessed regions.

2. The method according to claim 1, wherein the negligible interfacial surface tension between the first and the second solvents and a negligible Laplace pressure inside emulsified droplets of the first and second solvents keeps the emulsified droplets from coalescing and breaking without a need for an emulsifier.

3. The method according to claim 1, further comprising:
   suspending the building blocks by dispersion in combination with mechanical vibration and/or sonication.

4. The method according to claim 1, wherein a solubility between the first solvent and the second solvent is 0.5 wt. % to 35 wt. %.

5. The method according to claim 1, wherein the building blocks are solid particles, polymers, molecules, and/or ions.

6. The method according to claim 1, wherein the building blocks have a size ranging from atomic to micrometer.

7. The method according to claim 1, further comprising:
   introducing the first solvent into the recessed regions on the template by dropping, dripping, or wetting.

8. The method according to claim 7, further comprising:
introducing the second solvent with the suspended building blocks on the template of patterned recessed regions by dropping, dripping, or wetting; and
wherein a volume of the second solvent with the suspended building blocks introduced is at least twice a volume of the first solvent remaining on the template.

9. The method according to claim 8, further comprising:
introducing a sweeping solvent onto the template by dropping, dripping, or washing to remove excess second solvent on a surface of the template.

10. The method according to claim 9, wherein a volume of the sweeping solvent introduced is at least five times the volume of the second solvent with the building blocks introduced on the template.

11. The method according to claim 9, wherein the sweeping solvent is the first solvent in a relatively pure form.

12. The method according to claim 1, further comprising:
tuning a size of the supraparticles in the recessed regions by varying a concentration of the building blocks suspended in the second solvent and/or a size of the recessed regions.

13. The method according to claim 1, wherein the supraparticles have a spherical structure, an ellipsoidal structure, or a form of irregular placement of solid particles.

14. The method according to claim 1, wherein the first solvent is butanol or pentanol, and the second solvent is water.

15. The method according to claim 14, wherein the first solvent is 1-butanol.

16. The method according to claim 1, wherein building blocks are selected from a group consisting of $SiO_2$ nanoparticles, $Fe_3O_4$ nanoparticles, polydopamine (PDA) nanoparticles, gold nanoparticles, CdTe quantum dots, FeOOH nanorods, and $Fe_2O_3$ nanodiscs.

17. The method according to claim 1, wherein the building blocks are biopolymer molecules, the biopolymer molecules being chitosan, casein proteins, fish sperm DNA, and/or live *Micrococcus* cells.

18. The method according to claim 1, wherein the building blocks are micro-crystals of NaCl, micro-crystals of $Na_2SO_3$, or micro-crystals of $Na_2SO_4$.

19. The method according to claim 1, wherein the patterned recessed regions are selected from a group consisting of cylindrical microhole-arrays, cylindrical dimer microhole-arrays, inverted pyramid microhole-arrays, cylindrical trimer microhole-arrays, tetramer microhole-array films, and microhole-arrays with an irregular shape.

20. The method according to claim 1, further comprising:
tuning the supraparticles by applying an external stimulus during the diffusion of the droplets of the first solvent by the second solvent.

21. The method according to claim 20, wherein the external stimulus is a magnetic field or an electrical field.

22. The method according to claim 1, further comprising:
using the supraparticles in an electronic display, a display panel, a semiconductor device, an electronic device, a drug carrier, a biosensor, a nanoscale fabrication of protein chips, a cell sorting application, and/or an energy production and storage material.

* * * * *